H. R. CONKLIN.
METHOD AND APPARATUS FOR DETERMINING SUBTERRANEOUS CONDUCTORS.
APPLICATION FILED NOV. 6, 1916.
1,241,197.  Patented Sept. 25, 1917.
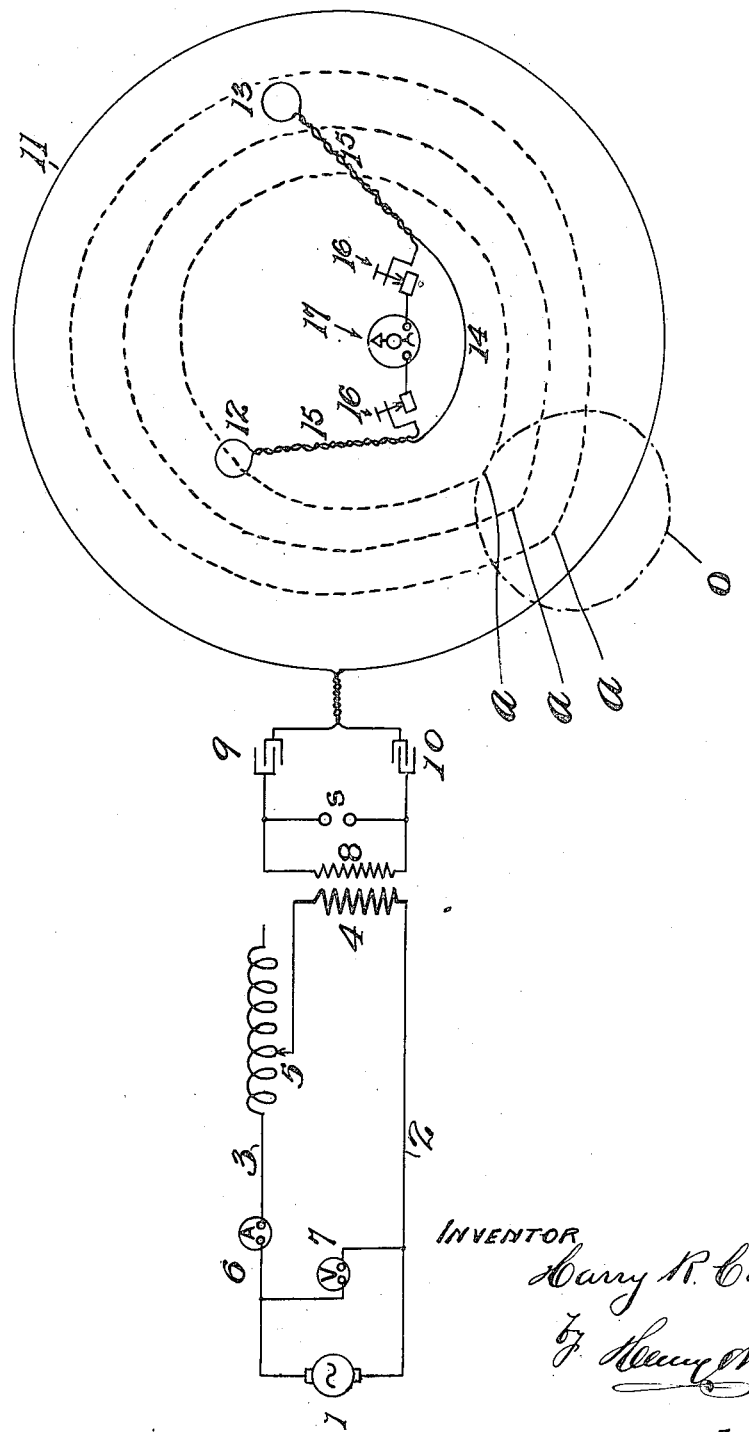
INVENTOR
Harry R. Conklin
by
ATTORNEY.

UNITED STATES PATENT OFFICE.

HARRY R. CONKLIN, OF JOPLIN, MISSOURI.

METHOD AND APPARATUS FOR DETERMINING SUBTERRANEOUS CONDUCTORS.

1,241,197.   Specification of Letters Patent.   Patented Sept. 25, 1917.

Application filed November 6, 1916. Serial No. 129,772.

*To all whom it may concern:*

Be it known that I, HARRY R. CONKLIN, a citizen of the United States of America, residing at Joplin, Jasper county, Missouri, have invented certain new and useful Improvements in Methods and Apparatus for Determining Subterraneous Conductors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a method and apparatus for detecting electrically conductive bodies below the surface of the earth, such as bodies of electrically conductive ore, the location of buried pipe lines and the like.

I have used my method and apparatus more particularly in locating ores which are electrical conductors, such as galena, pyrites, native gold, sulfid of silver, native copper, copper sulfid, and the like.

In carrying out the method I produce an oscillating magnetic field whose axis is substantially perpendicular to the surface being explored by means of an oscillating electric current, and explore this field to determine the contours within it of equal magnetic flux; the deviation of the contours in shape from the shape of the line of induction for the magnetic field, by means of an ore body in said magnetic field, determines the location of said ore body. The contour lines are properly plotted within the magnetic field to show their deviation in shape from the shape of the line of induction. In other words, I determine the deviation of the oscillating magnetic field from its normal, such deviation being produced by a subterraneous conductor.

I have found by practical experience that the presence of liquids and solutions does not cause a distortion of the oscillating magnetic field.

Bore holes are sunk in the area showing the deviation in the line of equal flux to determine the depth and quantity of the ore, or to ascertain its character.

In carrying out my method I proceed as follows, reference being had to the accompanying drawing, in which—

1 is an alternating current generator from which run lines 2 and 3 to the primary coil 4 of a transformer, there being a regulating inductive resistance 5 included in the circuit. An alternating current ammeter 6 is also included in the circuit, and across the circuit is maintained an alternating current voltmeter 7. These two meters may be omitted, but they are desirable as indicators to determine the proper operation of the apparatus.

The primary coil 4 of the transformer acts on a secondary coil 8 in the oscillating circuit, with which are connected in series condensers 9 and 10, and means for determining and producing an oscillating magnetic substantially annular field, as a wire loop or coil 11 of large diameter, which forms the line of induction for the oscillating magnetic field.

The condensers, as will be seen from the diagram, are arranged one at each side of the loop or coil 11. A hot wire ammeter may be arranged for temporary series connection with the loop or coil 11, for determining the quantity of current flowing in the coil.

A spark gap *s* is included in the secondary circuit in parallel with the secondary winding 8 of the transformer. This structure is substantially the equivalent of any well known current structure for obtaining high oscillating current, the object being to cause said current to travel in a closed path through the loop or coil 11 to produce an oscillating magnetic field within the area of said coil.

The diameter of the coil or loop 11 may be varied to suit particular circumstances, but usually such coils or loops 11 are from about 200 to 1000 feet in diameter. The shape of this coil or loop 11, which is laid upon the surface of the ground, is preferably, but not necessarily, approximately circular. Within this circle or loop 11 I have two exploring coils, 12 and 13, from about three to four feet in diameter, the diameter being proportioned to the amount of magnetic flux within the primary coil 11.

I have found that each exploring coil, 12 or 13, must consist of several turns of wire.

These two coils, 12 and 13, are connected together by wires 14 and 15, and included in the wire 15 are crystal rectifiers 16, one on each side of a current indicator or galvanometer 17. The wires 14 and 15 are twisted together to prevent unequal induction in these exploring coil leads. For the same reason the coils 12 and 13, and their leads 14, 15 are made as nearly alike as practicable.

The exploring coils, current rectifiers and galvanometer are symmetrically arranged in series in a closed circuit, as shown, the exploring coils having their induced currents opposed to each other.

When the coil or loop 11 is laid on the ground and the high frequency oscillating current is sent through it, it produces a magnetic flux or field, perpendicular thereto, which reaches into the earth below. One of the exploring coils, say for example, 13, is placed a definite distance from the center of the loop 11, and the coil 12 is moved around the loop so as to give a minimum galvanometer reading, and the path of the exploring coil 12 is then plotted.

If a conductor, such as indicated at O, be beneath the primary coil or loop 11, the contour lines will be distorted, as shown at $a$, in the direction of said conductor.

In order to determine the area and outline of the ore body or the subterranean conductor O, the primary coil 11 is shifted until a sufficient number of sets of contour lines have been observed to determine the outline, size, and approximate strength of the conductor, and if it be a body of ore, the degree of distortion of the contour lines is approximately a measure of the density or richness of the ore.

After the size and contour of the ore body have been determined by the plotting of the contours, it is checked and the character of the ore determined by drilling.

A subterranean conductor, which is within a distance below the surface of approximately two-thirds the diameter of the primary coil, will measurably distort the contour lines of magnetic flux in the plane of the primary coil.

Instead of using two exploring coils and the balanced mechanism above described, a single exploring coil may be used, to which is attached a telephone and a single current rectifier. The telephone will produce a hum similar to that in a wireless telephone receiver, and the variation of this sound is an indication of the variation of the intensity of the oscillating magnetic field within the loop 11.

I claim—

1. The method of determining a subterranean conductor, which comprises forming an oscillating magnetic field at the surface of the ground the axis of which field is substantially perpendicular to the surface being explored, and determining the distortion of said field due to the influence of the subterranean conductor.

2. The method of determining a subterranean conductor, which comprises forming at the surface of the ground an oscillating magnetic field the axis of which field is substantially perpendicular to the surface being explored, exploring said field to determine contours of equal magnetic flux, the deviation of said contours in shape from the line of generation of said oscillating magnetic field determining the presence of the subterranean conductor.

3. The method of determining a subterranean conductor, which comprises forming an oscillating magnetic field at the surface of the ground the axis of which field is substantially perpendicular to the surface being explored, inducing currents in a pair of exploring coils within said field, and plotting the positions of said coils for minimum readings of opposed currents from the coils.

4. The method of determining a subterranean conductor, which comprises forming an oscillating magnetic field extending into the earth the axis of which field is substantially perpendicular to the surface being explored, inducing in a pair of exploring coils in said field oscillating currents, rectifying said currents, and sending the rectified currents in opposition through a current indicator.

5. The method of determining a subterranous conductor, which comprises forming an oscillating magnetic field extending into the earth and whose axis is substantially perpendicular to the surface being explored, inducing in a pair of exploring coils in said field oscillating currents, rectifying said currents, and sending the rectified currents in opposition through a current indicator and plotting the lines of equal magnetic flux in said field.

6. Apparatus for determining the location of subterranean conductors, which comprises means for producing and determining an oscillating magnetic field the axis of which field is substantially perpendicular to the surface being explored, exploring coils movable in said field and connected together in series, a current rectifier for each coil and a current indicator included between said rectifiers.

7. Apparatus for determining the location of subterranean conductors, which comprises an oscillating circuit, a loop connected thereto and through which the oscillations are sent to produce an oscillating magnetic field within said loop, two substantially equal exploring coils, a current rectifier connected to each coil, and a galvanometer arranged between said rectifiers, said coils, rectifiers and galvanometer arranged in series in a closed circuit.

8. Apparatus for determining the location of subterranean conductors, which comprises means at the surface of the ground for producing an oscillating magnetic field extending into the ground whose axis is substantially perpendicular to the surface being explored, an exploring winding movable within said field and means, and a current rectifier connected in electrical circuit with said winding, and means electrically connected to said winding and rectifier to detect variations of current in said winding.

In testimony that I claim the foregoing as my invention, I have signed my name in presence of two subscribing witnesses.

HARRY R. CONKLIN.